United States Patent [19]
Tsai et al.

[11] Patent Number: 5,119,005
[45] Date of Patent: Jun. 2, 1992

[54] CONTROLLER FOR NON-LINEAR POSITION SERVO

[75] Inventors: Shan-Chin Tsai, Rockford, Ill.; Dean S. Schrage, Westlake, Ohio

[73] Assignee: Sundstrand Corporation, Rockford, Ill.

[21] Appl. No.: 573,817

[22] Filed: Aug. 28, 1990

[51] Int. Cl.⁵ .............................................. G05B 5/01
[52] U.S. Cl. .................................... 318/618; 318/616; 318/631; 318/609; 318/610; 417/222 R
[58] Field of Search ............... 318/561, 608, 609, 610, 318/612, 616, 618, 620, 625, 628, 632, 635, 638; 417/222; 60/448, 911

[56] References Cited

U.S. PATENT DOCUMENTS

| | | |
|---|---|---|
| 4,540,923 | 9/1985 | Kade et al. |
| 4,675,804 | 6/1987 | Wiemer |
| 4,727,303 | 2/1988 | Morse et al. ......................... 318/616 |
| 4,843,292 | 6/1989 | Futami |
| 4,950,967 | 8/1990 | Sakamoto et al. .................. 318/567 |
| 4,967,128 | 10/1990 | Sawai et al. ......................... 318/609 |
| 4,983,099 | 1/1991 | Tsai ................................. 417/222 R |

*Primary Examiner*—Paul Ip
*Attorney, Agent, or Firm*—Antonelli, Terry, Stout & Kraus

[57] ABSTRACT

A servo control system (100) for controlling a prime mover (16) to position a load (12) to a commanded position in accordance with the invention includes a position sensor (14) for providing a load position signal representative of a position of the load; a controller for producing a control signal controlling activation of the prime mover to cause the load to be positioned at the commanded position including a first summer (20) for producing a first difference signal equal to a difference between a position command specifying the commanded position and the load position signal which is applied to a proportional amplifier (22) and an integrator (24), a second summer (26) for producing a sum of outputs from the proportional amplifier and the integrator and a third summer (104) for producing the control signal which is equal to a difference between the sum of the outputs and a signal proportional to the load position signal.

20 Claims, 2 Drawing Sheets

CONTROLLER FOR NON-LINEAR POSITION SERVO

TECHNICAL FIELD

The present invention relates to servo systems for controlling the position of a load which is acted upon by an external force and/or includes non-linearities.

BACKGROUND ART

Servo systems for positioning a load at a commanded position are known. A conventional servo system for positioning a load controls the actuation of a prime mover such as an electrical motor to cause a load which may be variable to move to a commanded position. A position sensor associated with the motor shaft or the load generates a position signal which is compared to a commanded position. An error signal which is equal to the difference between the commanded position and the actual system is applied to a proportional amplifier which controls the activation of the prime mover. Although the system contains an integration element in the prime mover, non-linearities, such as static and Coulomb friction, backlash in gear trains and quantization effects cause a positioning system of the foregoing type to have a poor steady state accuracy.

Positioning error in a system of the foregoing type may be decreased by increasing the gain of the control loop driving the prime mover. However, increased gain has the disadvantage of rendering the system oscillatory. At steady state, a finite position error will be present which can be exacerbated by an external disturbance acting on the load or a non-linearity in the load and/or prime mover.

FIG. 1 illustrates a prior art position control system 10 for positioning a load 12 at a commanded position. The load 12 is acted upon by an external force, such as a wind current, acting upon a flight control surface or the load or prime mover 16 contains non-linearities. The position of the load 12 is sensed by a position sensor 14 which may be associated with the load or an output shaft 18 of a prime mover 16. The position detector 14 produces a position signal which is applied to a summer 20 which computes the difference between the commanded position and the actual sensed position. The resultant output error signal is applied to a proportional amplifier 22.

The performance characteristic of the system 10 of FIG. 1 is acceptable when the external force and/or non-linearities are not present in the load 12 or prime mover. However, the presence of these effects prevents the system from achieving a high level of performance necessary for applications such as actuators for flight control surfaces of high performance aircraft.

DISCLOSURE OF INVENTION

The present invention reduces phase lag caused by the velocity to position integration performed by a prime mover moving a load to a commanded position. With the invention, an integrator is added to an outer position loop and an inner loop is added which reduces the phase lag produced by the prime mover. The inner loop contains a proportional amplifier which amplifies a signal proportional to the sensed position of the load which is subtracted from the sum of the proportional amplification and an integrator which integrates the difference between the position command and the sensed position.

The invention reduces the open loop phase lag, permits higher gains to be utilized by the proportional amplifier and by the integrator which results in a higher speed of response. This system provides zero steady state error. Finally, from a practical control standpoint, the provision of a proportional amplifier in the inner loop provides an additional control design parameter for controlling the operation of a system for controlling the positioning of a load which is acted upon by an external force alone or in combination with a prime mover contains non-linearities.

A servo system for controlling a prime mover to position a load to a commanded position in accordance with the invention includes a position sensor for providing a load position signal representative of a position of the load; a controller for producing a control signal controlling activation of the prime mover to cause the load to be positioned at the commanded position including a first summer for producing a first difference signal equal to a difference between a position command specifying the commanded position and the load position signal which is applied to a proportional amplifier and an integrator, a second summer for producing a sum of outputs from the proportional amplifier and integrator and a third summer for producing the control signal which is equal to a difference between the sum of the outputs and a signal proportional to the load position signal. The load may be acted upon by an external force alone or in combination with prime mover contains non-linearities. The invention further includes a limiter, coupled to the output of the third summer, for limiting the control signal applied to the prime mover from exceeding a set magnitude. A switch is disposed between the first summer and the integrator which has a conductive state coupling the output of the first summer to the integrator and a non-conductive state which isolates the output of the summer from the integrator, the states being controlled by an integrator control signal; and wherein the limiter produces the integrator control signal with the integrator control signal causing the first state when the control signal does not equal the limit of the limiter and causing the second state when the control signal equals the limit. The prime mover may be an electric motor.

In a servo system for controlling a prime mover to position a load to a commanded position having a position sensor for providing a load position signal representative of a position of the load and a controller for producing a control signal controlling activation of the prime mover to cause the load to be positioned at the commanded position as a function of a proportional amplification of the difference between a position command specifying the commanded position and the load position signal, an improvement in accordance with the invention includes an integrator for integrating the difference between a position command specifying the commanded position and the load position signal and an adder adding the integrated difference to the proportional amplification of the difference and wherein the controller produces the control signal as a function of a difference between the sum of the proportional amplification and the integration and the load position signal. The load may be acted upon by an external force alone or in combination with the prime mover contain non-linearities. The invention further includes a limiter, coupled to the control signal, for limiting the control signal applied to the prime mover from exceeding a limit. A switch is disposed between a summer producing the difference between the position command specifying the commanded position and the load position signal and the integrator, which has a conductive state coupling the output of the summer to the integrator or a non-conductive state which isolates the output of the summer from the integrator, the states being controlled by an integrator control signal; and the limiter producing the integrator control signal with the integrator control signal causing the first state when the control signal does not equal the limit of the limiter and causing the second state when the control signal equals the limit.

A method of controlling a prime mover to position load to a commanded position in accordance with the invention includes producing a load position signal representative of a position of the load; and producing a control signal controlling activation of the prime mover to cause the load to be positioned at the commanded position by producing a difference signal equal to a difference between a position command specifying a commanded position and the load position signal, amplifying the difference signal, integrating the difference signal, summing the amplified and integrated difference signal and subtracting the load position signal from a sum of the amplified and integrated difference signal to produce the control signal. The method further includes stopping the integration of the difference signal when the control signal equals a limit.

BEST MODE FOR CARRYING OUT THE INVENTION

Figure 1:
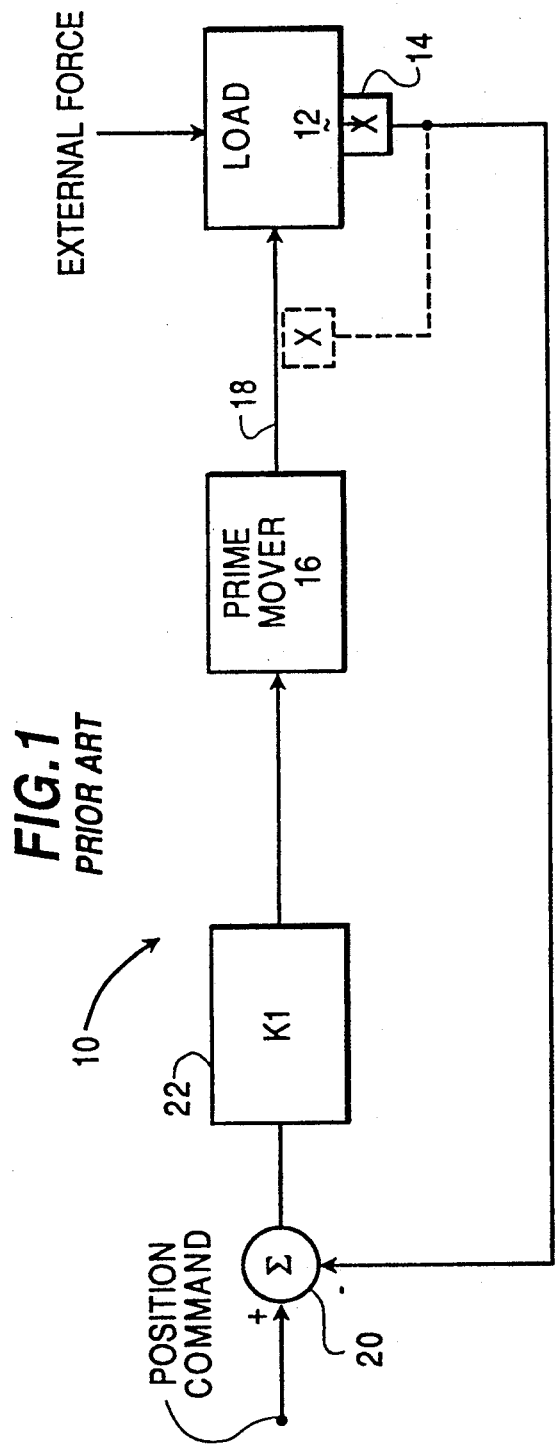
FIG. 1 illustrates a block diagram of a prior art position control system for a load.
Figure 2:
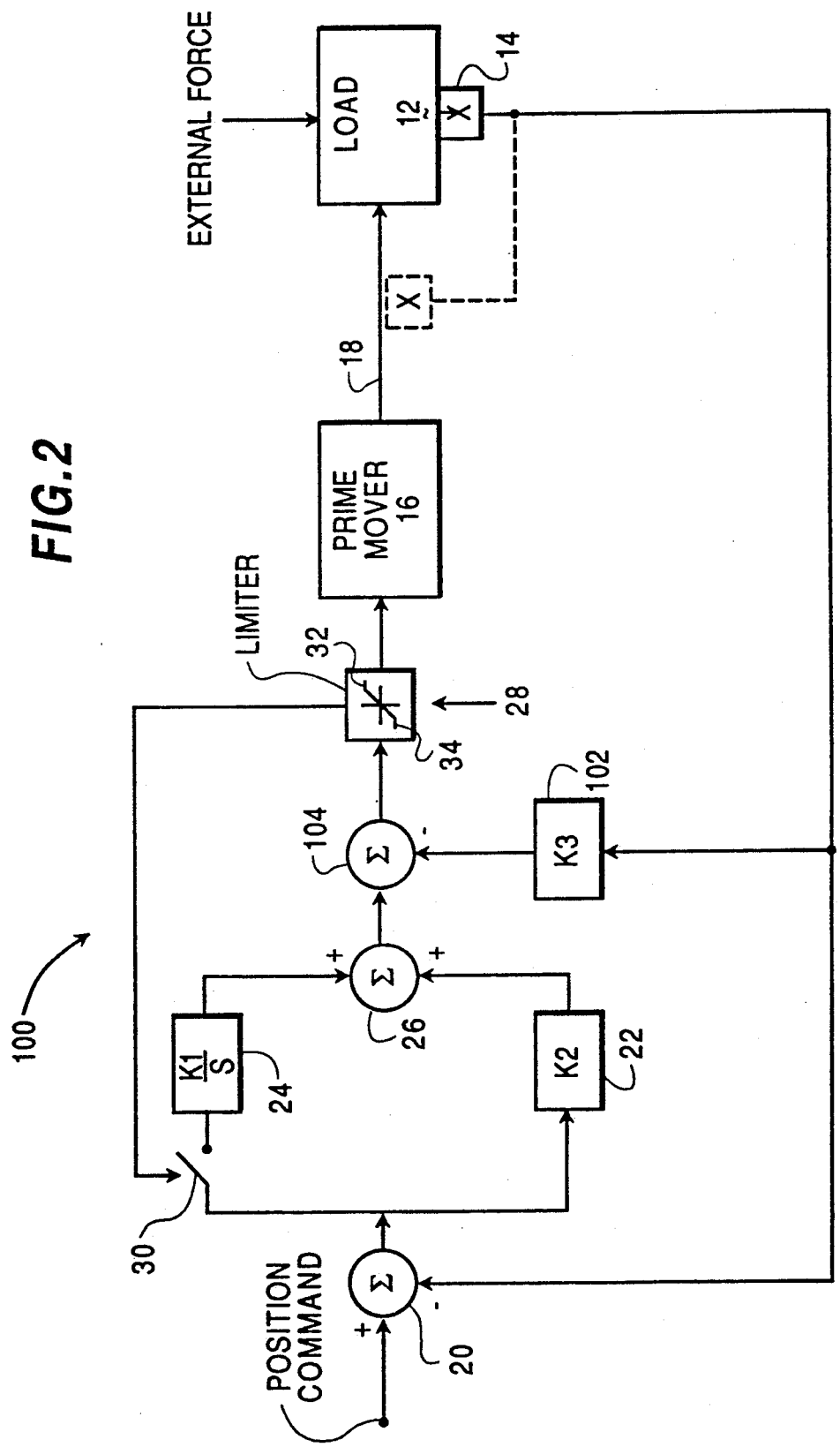
FIG. 2 illustrates a block diagram of a position control system for a load in accordance with the present invention.

FIG. 2 illustrates a block diagram of a position control system 100 in accordance with the present invention for positioning a load at a position specified by a position command. The load may be acted upon by an external force such as a wind current against a flight control surface in a high performance aircraft and/or in combination with a prime mover containing non-linearities. Like reference numerals identify like parts in FIGS. 1 and 2.

The integrator 22 adds an additional 90° phase lag to the control system 100 which already includes the inherent integrator in the prime mover 16 converting velocity to position. Large phase lags in a control system produce a low stability margin or cause the system to become unstable. Lowering the gain 22 of the amplifier 22 and integrator 24 will enhance stability, but the overall speed of response of the system is degraded (i.e., lower bandwith). The addition of only an integrator 24 to the prior art system of FIG. 1 would not meet stringent performance criteria where a load is acted upon by an external force, such as a wing surface actuator, or alone or in combination with the prime mover 16 containing non-linearities.

The present invention of FIG. 2 differs from the prior art of FIG. 1 in that integrator 24 has been added in parallel with the proportional amplifier 22 and an inner loop has been added with the position signal produced by position detector 14 being amplified by proportional amplifier 102 and subtracted from the sum of the proportional amplification produced by proportional amplifier 22 and integration produced by integrator 24 of the difference between the position command and the position signal by summer 104. The limiter 28 functions to control the switch 30 which is disposed between the summer 20 and integrator 24 to prevent integrator wind-up which fixes the output of the integrator when the limiter 28 reaches its limits. The switch 30 has a conductive state coupling the output of the summer 20 to the integrator 24 and a non-conductive state which isolates the output of the summer from the integrator with the states being controlled by an integrator control signal produced by the limiter 28. The limiter produces the integrator control signal with the integrator control signal causing the first state when the control signal does not equal the limit of the limiter and causing the second state when the control signal equals the limit. The addition of the proportional amplification 102 lessens the lag caused by the inherent integration associated with the prime mover 16. The result of adding the inner loop with the proportional amplifier 102 is to reduce the 90° lag caused by the velocity to position integration produced by the prime mover 16. The function of the amplifier 102 and summer 104 may be performed by a single amplifier with different gains on the inputs.

A preferred application of the control system is for positioning the flight control surfaces of an airframe. The prime mover may be a variable reluctance motor which is able to withstand high temperature operation as a consequence of a rotor design not containing windings. The present invention has been shown to eliminate steady state error. The system of FIG. 2, without the inner loop produced by the proportional amplifier 102, yielded at best a 20% overshoot with the same settling time. Finally, an advantage of adding the inner loop with the proportional amplifier 102 is that the inner position feedback loop provides an additional parameter for adjustment for better performance.

A method of controlling a prime mover 16 to position the load 12 to a commanded position in accordance with the invention includes producing a load position signal representative of a position of the load by a position sensor 14; and producing a control signal which is outputted by limiter 32 controlling activation of the prime mover 16 to cause the load to be positioned at the commanded position by producing a difference signal produced by summer 20 equal to a difference between a position command specifying the commanded position and the load position signal, amplifying the difference signal by amplifier 22, integrating the difference signal by integrator 24, summing the amplified and integrated difference signal by summer 26 and subtracting the load position signal from the sum of the amplified and integrated difference signal by summer 104 to produce the control signal.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A servo system for controlling a prime mover to position a load to a commanded position comprising:
   a position sensor for providing a load position signal representative of a position of the load; and a controller for producing a control signal controlling activation of the prime mover to cause the load to be positioned at the commanded position including a first summer for producing a first difference signal equal to a difference between a position command specifying the commanded position and the load position signal which is applied to a proportional amplifier and an integrator, a second summer for producing a sum of outputs from the proportional amplifier and the integrator and a third summer for producing the control signal which is equal to a difference between the sum of outputs and a signal proportional to the load position signal.

2. A servo system in accordance with claim 1 wherein:
the load is acted upon by an external force.

3. A servo system in accordance with claim 1 further comprising:
a limiter, coupled to the output of the third summer, for limiting the control signal applied to the prime mover from exceeding a set magnitude.

4. A servo system in accordance with claim 2 further comprising:
a limiter, coupled to the output of the third summer, for limiting the control signal applied to the prime mover from exceeding a set magnitude.

5. A servo system in accordance with claim 3 further comprising:
a switch, disposed between the first summer and the integrator, which has a conductive state coupling the output of the first summer to the integrator and a non-conductive state which isolates the output of the first summer from the integrator, the states being controlled by an integrator control signal; and wherein
the limiter produces the integrator control signal with the integrator control signal causing the first state when the control signal does not equal the limit of the limiter and causing the second state when the control signal equals the limit.

6. A servo system in accordance with claim 4 further comprising:
a switch, disposed between the first summer and the integrator, which has a conductive state coupling the output of the first summer to the integrator and a non-conductive state which isolates the output of the first summer from the integrator, the states being controlled by an integrator control signal; and wherein
the limiter produces the integrator control signal with the integrator control signal causing the first state when the control signal does not equal the limit of the limiter and causing the second state when the control signal equals the limit.

7. A servo system in accordance with claim 1 wherein:
the prime mover is an electric motor.

8. A servo system in accordance with claim 2 wherein:
the prime mover is an electric motor.

9. A servo system in accordance with claim 3 wherein:
the prime mover is an electric motor.

10. A servo system in accordance with claim 4 wherein:
the prime mover is an electric motor.

11. A servo system in accordance with claim 5 wherein:
the prime mover is an electric motor.

12. A servo system in accordance with claim 6 wherein:
the prime mover is an electric motor.

13. In a servo system for controlling a prime mover to position a load to a commanded position having a position sensor for providing a load position signal representative of a position of the load and a controller for producing a control signal controlling activation of the prime mover to cause the load to be positioned at the commanded position as a function of a proportional amplification of a difference between a position command specifying the commanded position and the load position signal, the improvement comprising:
an integrator integrating the difference between the position command specifying the commanded position and the load position signal and an adder adding the integrated difference to the proportional amplification of the difference; and wherein
the controller includes a summer, coupled to an output of the adder and to the load position sensor, for producing the control signal as a function of a difference between the load position signal and the sum of the proportional amplification and the integration produced by the integrator.

14. A servo system in accordance with claim 13 wherein:
the load is acted upon by an external force.

15. A servo system in accordance with claim 13 further comprising:
a limiter, coupled to the control signal, for limiting the control signal applied to the prime mover from exceeding a limit.

16. A servo system in accordance with claim 14 further comprising:
a limiter, coupled to the control signal limiting the control signal applied to the prime mover from exceeding a limit.

17. A servo system in accordance with claim 15 further comprising:
a switch, disposed between the summer producing the difference between the position command specifying the commanded position and the load position signal and the integrator, which has a conductive state coupling the output of the summer to the integrator and a non-conductive state which isolates the output of the summer from the integrator, the states being controlled by an integrator control signal; and
the limiter producing the integrator control signal with the integrator control signal causing the first state when the control signal does not equal the limit of the limiter and causing the second state when the control signal equals the limit.

18. A servo system in accordance with claim 16 further comprising:
a switch, disposed between the summer producing the difference between the position command specifying the commanded position and the load position signal and the integrator, which has a conductive state coupling the output of the summer to the integrator and a non-conductive state which isolates the output of the summer from the integrator, the states being controlled by a integrator control signal; and the limiter producing the integrator control signal with the integrator control signal causing the first state when the control signal does not equal the limit of the limiter and causing the second state when the control signal equals the limit.

19. A method of controlling a prime mover to position a load to a commanded position comprising:

producing a load position signal representative of a position of the load; and producing a control signal controlling activation of the prime mover to cause the load to be positioned at the commanded position by producing a difference signal equal to a difference between a position command specifying the commanded position and the load position signal, amplifying the difference signal, integrating the difference signal, summing the amplified and integrated difference signal and subtracting the load position signal from a sum of the amplified and integrated difference signal to produce the control signal.

20. A method is accordance with claim 19 further comprising:

stopping the integration of the difference signal when the control signal equals a limit.

* * * * *